July 2, 1968     B. LIEBOWITZ     3,390,782
CONTINUOUS SEDIMENTATION TANK HAVING ROTATABLE
SEDIMENT CONVEYING STRUCTURE
Filed July 19, 1967     8 Sheets-Sheet 1

INVENTOR.
BERNARD LIEBOWITZ
BY Theodore M. Jablon
ATTORNEY.

INVENTOR.
BERNARD LIEBOWITZ
BY Theodore W. Jablon
ATTORNEY.

July 2, 1968

B. LIEBOWITZ

3,390,782

CONTINUOUS SEDIMENTATION TANK HAVING ROTATABLE
SEDIMENT CONVEYING STRUCTURE

Filed July 19, 1967

INVENTOR.
BERNARD LIEBOWITZ

BY Theodore M. Jablon

ATTORNEY

United States Patent Office 3,390,782
Patented July 2, 1968

3,390,782
CONTINUOUS SEDIMENTATION TANK HAVING ROTATABLE SEDIMENT CONVEYING STRUCTURE
Bernard Liebowitz, Stamford, Conn., assignor to Dorr-Oliver Incorporated, Stamford, Conn., a corporation of Delaware
Continuation-in-part of application Ser. No. 459,310, May 27, 1965. This application July 19, 1967, Ser. No. 660,551
17 Claims. (Cl. 210—531)

ABSTRACT OF THE DISCLOSURE

A drive head for a bridge supported depending rotary rake structure, featuring a main drive gear concentric with the rake shaft, having a downward tubular extension mounted for rotation in vertically spaced upper and lower combination bearings, with tolerance adjusting means for the bearings.

---

This application is a continuation-in-part of my prior copending application Ser. No. 459,310, filed May 27, 1965, and now abandoned.

This invention relates to continuously operating settling tanks, and more particularly to the type wherein the vertical shaft of the rotary sediment conveying structure extends downwardly from a drive head supported on a horizontal structure or bridge traversing the tank.

It is among the objects of this invention to provide a drive head preferably for heavy duty operation, which is of great simplicity and ruggedness. Such apparatus may handle heavy dense sludges, for example "Red Mud" from bauxite or the like. Rake lifting devices may be provided to enable the rake structure to work down a heavy sludge accumulation gradually, or else to free the rake structure if it has become bogged down in the heavy mud.

Another object is to provide a heavy duty drive head for the above purpose, capable of improved overall torque-balanced operation.

For the above indicated purposes, this invention provides a drive head wherein a drive gear rotates the vertical rake shaft coaxial therewith, featuring a gear that has a downward tubular extension fixedly connected thereto, in conjunction with a vertically oriented simple yet rugged bearing arrangement surrounding the gear extension for mounting the gear in a housing structure, and providing an effective vertical anti-tilting base for the shaft.

This bearing arrangement in the housing structure comprises an upper combination bearing and a lower combination bearing. The combination bearings each capable of transmitting radial bearing pressure as well as axially directed thrust, are arranged relative to each other so as to enable the drive head to absorb upward as well as downward thrust from the rake shaft. Means are provided for adjusting the operating tolerance between the bearings. There may be loose or tight tolerance adjustment. A tight tolerance adjustment may provide a pre-loaded condition for the bearings.

In one embodiment, the drive head has a lifting device mounted on the gear and rotating therewith, whereby the rake shaft is shifted in the gear while guided therein and in the tubular extension and secured therein against rotation.

In another embodiment, the rake shaft is fixed relative to the gear extension.

Other features lie in different forms of the tolerance adjusting means, in the construction of the housing structure and in the bearing arrangement therein, and in the arrangement of pinion drive units mounted atop the housing structure and hydraulic torque-balancing means therefor.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figures 1, 6, 7, 7A, 10:
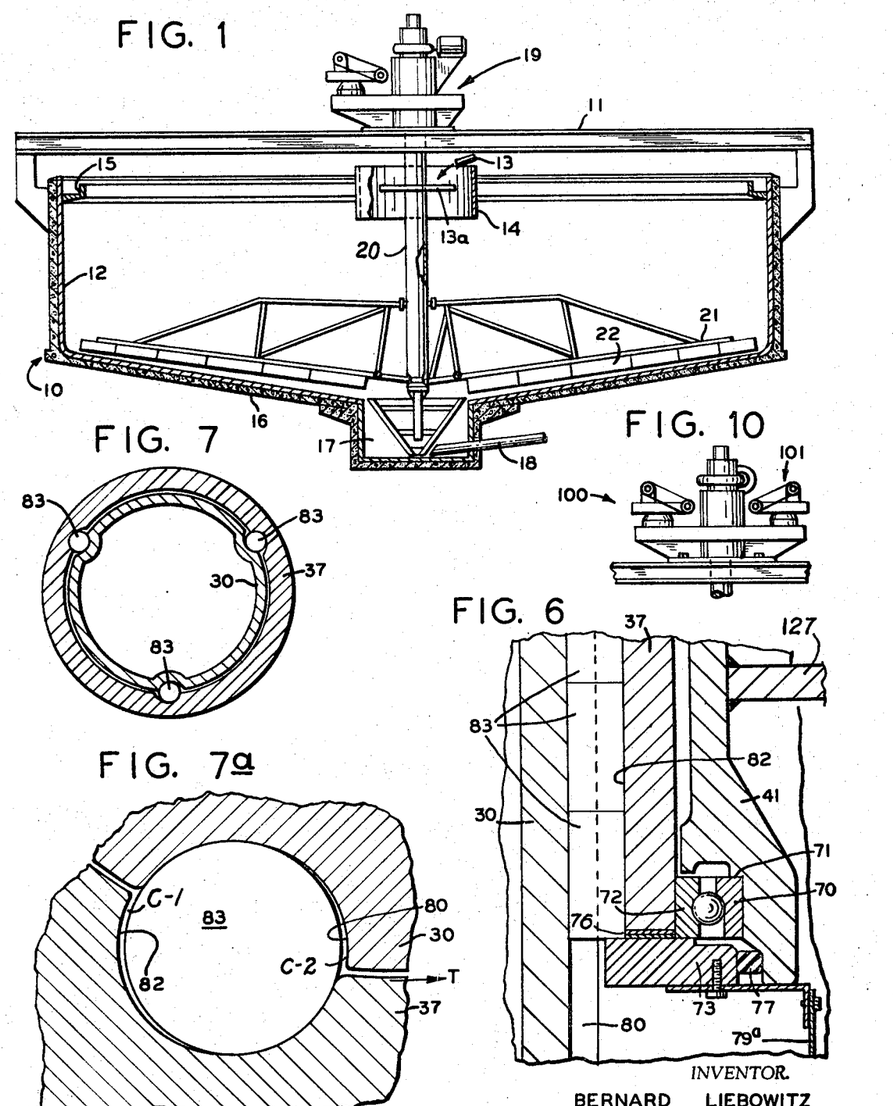
FIGURE 1 is a vertical sectional view of a continuous sedimentation tank illustrating a sediment conveying apparatus embodying the invention with rake lifting devices, and bearing tolerance adjustment means.
FIGURE 6 is a further enlarged detail view of the lower thrust bearing taken from FIG. 5, clearly showing the tolerance adjusting means for the bearings.
FIGURE 7 is a cross-sectional view of the drive head taken on line 7—7 of FIG. 5, showing balanced torque-transmitting means effective between the rake shaft member and the surrounding gear.
FIGURE 7a is a greatly enlarged detail view of the torque-transmitting means of FIG. 7.
FIGURE 10 is a semi-diagrammatic side view of a duplex drive arrangement shown in the top view of FIG. 8.

The improved sediment raking apparatus of this invention is embodied in a continuously operating settling tank of the type illustrated in FIG. 1, wherein a tank 10 has the apparatus supported upon a bridge construction or a pair of horizontal beams 11 traversing the tank and supported upon the walls 12 thereof. The tank has a feed supply for a slurry or suspension indicated at 13 delivering onto a baffle 13a in a feed well 14. The tank is shown to have the conventional overflow launder 15 for separated liquid, and a shallow conical bottom 16 over which the raking apparatus conveys the sediment to discharge sump 17 which has a sludge withdrawal conduit 18.

The sediment raking or conveying apparatus comprises a drive head 19 mounted upon the supporting beams 11, for rotating the vertical rake shaft 20 extending downwardly therefrom and carrying sediment engaging rake arms 21 provided with plowing blades 22 engaging and conveying sediment to the discharge sump.

Figure 2:
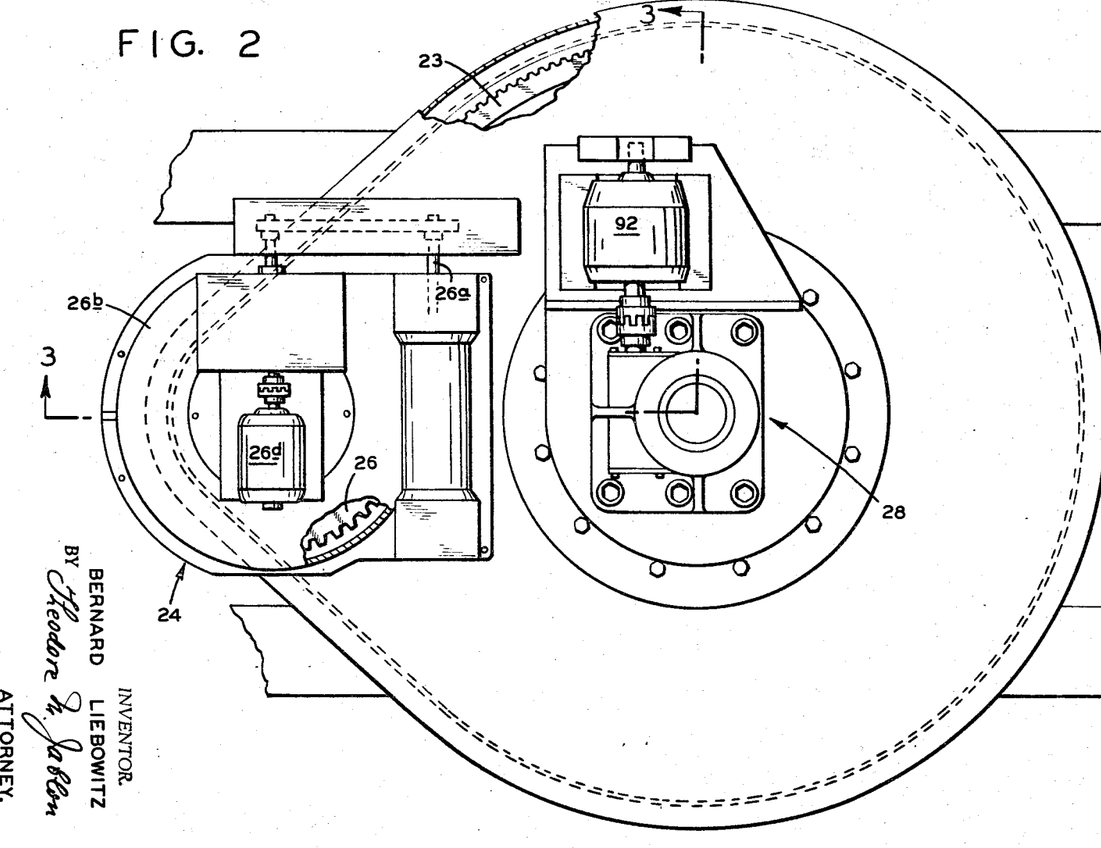
FIGURE 2 is a greatly enlarged top view of the drive head for the rotary rake structure depending therefrom.

Within the drive head (see FIGS. 2 and 3) there is mounted for rotation a drive gear preferably a spur gear 23 coaxial with the vertical rake shaft, and rotated by a pinion drive unit 24 which has a pinion 25 engaging the gear, and which is driven by a worm gear 26 connected thereto by a pinion shaft and associated worm shaft member 26a mounted in a gear casing 26b which has a bottom flange 26c mounted on the top side of a housing structure 27 which in turn is mounted on the beams. A motor 26d is mounted atop the gear casing 26b with driving connection to the worm shaft member.

Figures 3, 4, 11:
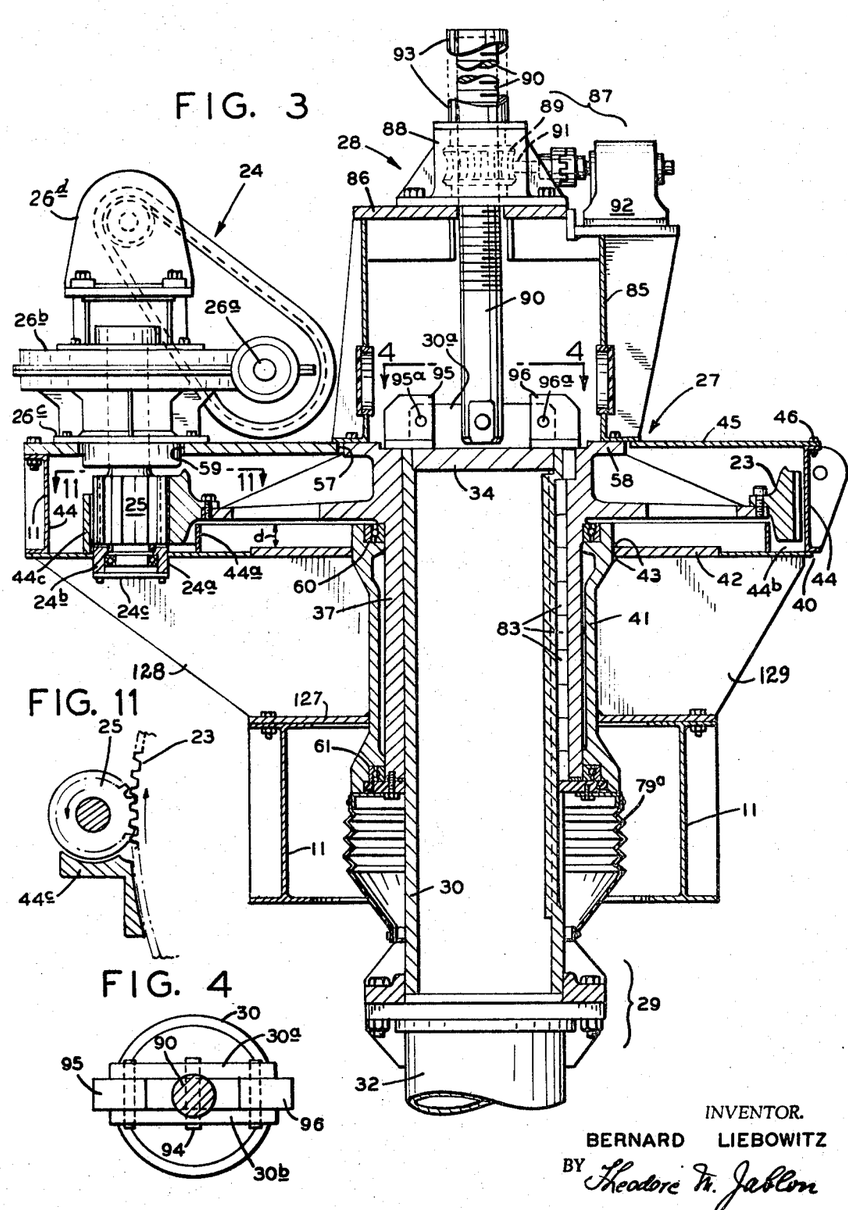
FIGURE 3 is a vertical section of the drive head taken on line 3—3 in FIGURE 2, showing details of the mechanism, including the rake lifting devices.
FIGURE 4 is a detail cross-sectional view of the rake lifting device, taken on line 4—4 of FIG. 3.
FIGURE 11 is a detail view taken on line 11—11 in FIG. 3, showing an oil dam to help lubricating the gear.

Further shown are motorized rake lifting devices 28 in the drive head, whereby the rake structure itself may be raised or lowered for adjustment to varying load conditions. The lifting device axially raises or lowers the rake shaft 20 which is slideable in the gear 23 which in turn has torque transmitting means effective between it and the shaft. The torque transmitting means are torque-balanced to allow for non-binding shifting movement of the shaft, as will be furthermore described.

Figure 5:
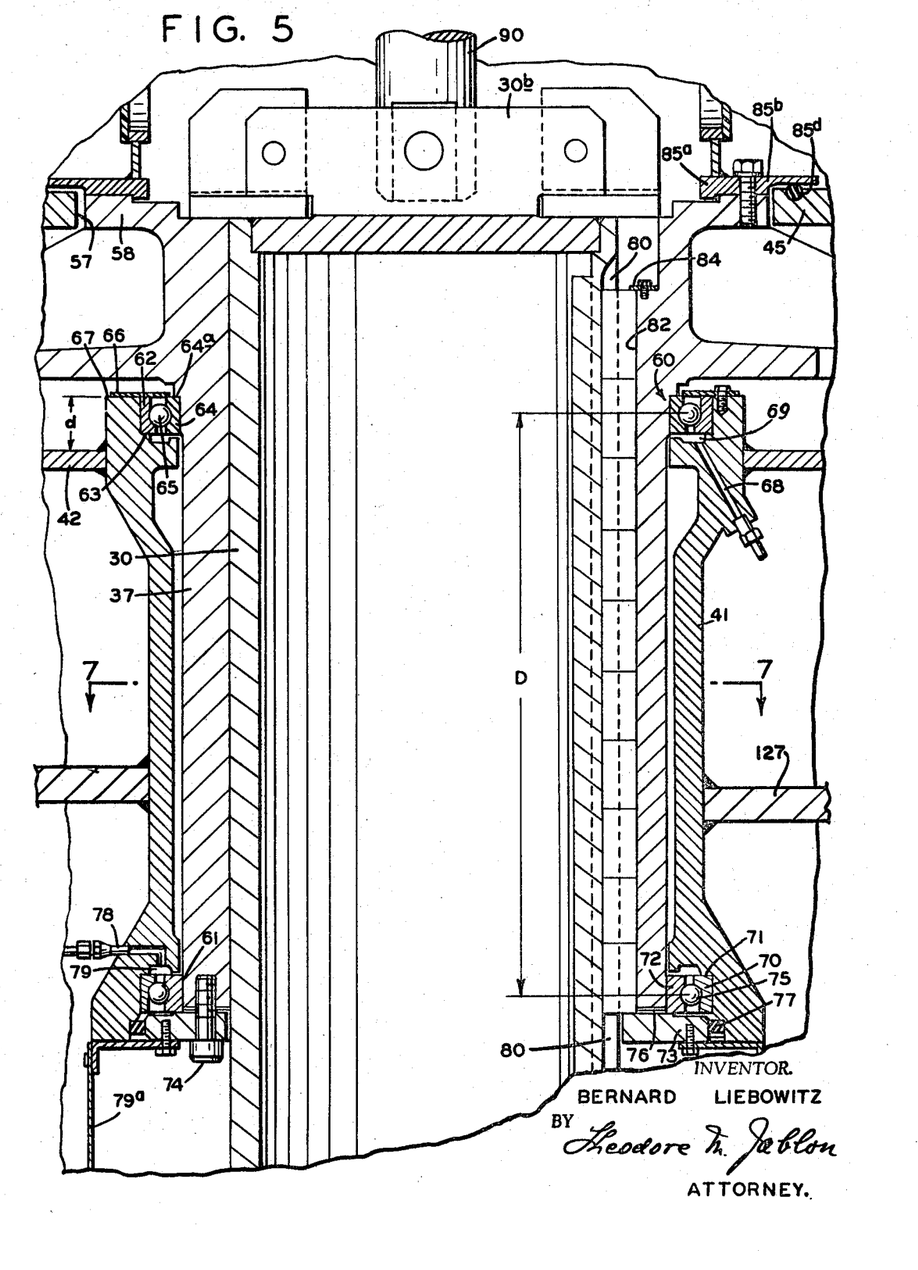
FIGURE 5 is a large detail view of FIG. 3, clearly showing vertically spaced thrust bearings in the mechanism, and one form of the bearing tolerance adjustment means.

In the embodiment of the invention illustrating the drive head in FIGURES 2 to 7, the vertical rake shaft 29 comprises a hollow stub shaft member 30 which has a rigid flange connection with the lower rake shaft portion 32 which carries the sediment engaging means. The top end of the stub shaft member is closed by an end plate 34 welded therein. The gear 23 has fixedly connected therewith a downwardly extending tubular hub portion or extension 37 providing a vertical guide surface for the rake shaft when the same is raised or lowered as by the rake lifting devices 28 furthermore to be described. While axially slideable in the gear the shaft has torque receiving connection therewith such as is shown in FIGURES 3, 5, and 7, designed and operable to offer a minimum of resistance to the axial movement of the shaft even though a heavy torque load from the sediment may be imposed thereon.

The housing structure 27 comprises an upper wide shallow section 40 accommodating the spur gear and the pinion, and a lower much narrower and higher cylindrical section 41. The top section consists of a bottom plate 42 shown to be welded as at 43 to the lower section a distance d from the top face thereof, an upright wall 44 fixed and preferably welded to the bottom plate along the peripheral edge portion thereof, and a top plate 45 detachably connected to the top end of the wall as indicated by bolts 46. The top plate has a central opening 57 which clears the hub portion 58 of the gear, the hub portion in turn providing the base for mounting thereon the rake lifting devices 28. The top plate also has an off-center opening 59 accommodating the pinion drive unit 24. The lower end of the pinion shaft has a steady bearing or end bearing 24a seated and contained in an annular casing member 24b which is welded into the bottom plate 42 of housing structure 27, and has a bottom closure plate 24c.

Spaced inwardly from the outer wall 44 is a lower inner circular wall 44a also welded to the bottom plate 42, and together therewith and with the outer wall constituting an oil trough 44b for the toothed rim portion of the gear. Also fastened to the bottom plate within the oil trough is an oil dam 44c cooperating with the gear and the pinion in a manner which is clear from FIG. 11, to help maintain effective lubrication of the gears.

The gear 23 is mounted for rotation in the cylindrical section 41 of the housing structure, by a vertically oriented bearing arrangement surrounding the downward tubular extension of the gear, and comprising an upper bearing 60 and a lower bearing 61, seated respectively in the upper and lower ends of the housing section 41, the vertical distance D between the bearings providing antitilting base and stability for the shaft.

Referring to the enlarged detail showing in FIG. 5, the upper bearing 60 is a combined radial and axial thrust bearing effective to transmit the weight of the rake structure from the gear to the downwardly adjacent portion of the housing structure. Accordingly, this bearing comprises an outer bearing race 62 seated on an internal shoulder 63 of the housing structure, and an internal bearing race 64 seated on an external shoulder 64a of the gear, with anti friction elements or balls 65 interposed between the bearing races. An annular cover element or seal 66 fastened to the top face 67 of the cylindrical housing section protects this bearing against the entry of impurities. A grease supply duct for this bearing is indicated at 68 leading to an annular grease distributing channel 69.

The lower bearing 61 also is a combined radial and thrust bearing, constructed and arranged for transmitting a thrust force in the opposite direction, that is upwardly from the gear to the housing structure. Accordingly, this bearing comprises an outer bearing race 70 seated on an internal shoulder 71 of the housing structure, and an inner bearing race 72 seated upon an annular retainer means 73 detachably fastened to the bottom face of the cylindrical housing section as indicated by fastening bolts 74, with anti-friction elements or balls 75 interposed between the bearing races.

Preferably, the annular retainer means are in the form of a split ring, or pair of mutually complementary halfring members. In order to provide optimum efficiency of the bearings as well as an optimum stability base for the depending shaft and rake structure, provision is made for interposing shim elements 76 between the retainer means and the bottom face of the housing structure for adjusting the operating tolerance in the bearings. The shims are shown as of exaggerated thickness, since actually they may be as thin as, say, 0.005 inch.

An annular grease seal 77 is effective between the annular retainer means and the surrounding bottom end portion of the housing structure to hold the grease while protecting this bearing against entry of extraneous matter. A grease supply for this bearing is indicated at 78 leading to the annular grease distributing channel 79. An accordion-shaped boot 79a of flexible material surrounding the hollow stub shaft member 30, sealingly connects the stub shaft member with the bearing retainer ring 73. This boot rotating with the shaft will expand or contract in accordance with the vertical raising or lowering of the shaft and rake structure, while protecting the vertical slide faces of the parts as well as the bearings against the intrusion of dust and dirt.

The manner of transmitting a balanced torque from the gear 23 to shaft member 30 and the transmitting means are illustrated in FIGS. 3, 5 and 7.

Accordingly, the shaft member is provided with a set of at least two and preferably three parallel longitudinal grooves 80 of substantially semi-circular cross-sectional profile. The surrounding tubular portion of the gear is formed internally with a corresponding set of grooves 82 of substantially semi-circulr profile, constituting with the first mentioned set of grooves composite cylindrical spaces.

Each of the cylindrical spaces contains a vertical series of mutually abutting cylindrical torque-transmitting elements 83, endwise confined in the grooves 82 as by a removable clip 84 at the top, and by the retainer ring 73 at the bottom. The grooves 80 in the shaft member are of considerably greater length than the grooves 82, to the extent required by the vertical shifting movement of the shaft.

The radii of the profile of the two sets of grooves 80 and 82 is slightly larger than that of the torque-transmitting cylindrical elements 83 (see FIG. 7a) allowing the torque transmitting elements in the respective cylindrical spaces to adjust themselves in their tangential contact with the grooves as well as relative to one another in such a manner that each of the three rows of torque transmitting elements assumes a substantially equal share of the torque to be transmitted from the gear to the shaft. In this way, the torque transmitting means will offer a minimum of resistance to the raising and lowering of the shaft by the rake lifting device 28 in that any undue binding is avoided, even if the shaft be rotated against heavy torque load resistance. It will be understood, however, that the bight-shaped clearances C–1 and C–2 between the cylindrical members 83 and the grooves 80 and 82, are greatly exaggerated, since the actual difference in the respective radii is actually only a matter of thousands of an inch.

The rake lifting device 28, in the embodiment shown, comprises a vertical cylindrical cage structure 85 having a bottom flange 85b bolted to the hub portion 58 of the gear. This flange has an outer peripheral portion or extrusion overhanging the adjacent edge portion of opening 57 in top plate 45 having sealing relationship therewith through an annular sealing member 85d substantially concentric with the vertical axis of rotation of the shaft. To the top plate 86 of the cage structure is bolted a worm gear drive unit 87. This unit comprises a gear casing 88 having mounted therein for rotation a worm gear 89 secured against axial displacement, and having threaded engagement with a threaded spindle 90 the lower end of which is connected to the rake shaft coaxially therewith and non-rotatable relative thereto. A worm shaft member 91 engaging the worm gear or nut member and driven by a reversible motor 92, may thus be rotated in the one or the other direction for either raising or lowering the rake structure. A protective vertical tubular shell 93 mounted on the gear casing encloses the upper end portion of the threaded spindle.

To the top end face of the shaft member 30 there are welded a pair of transversely extending parallel upright plates or ribs 30a and 30b (see FIGS. 3 and 4) having between them the lower end of spindle 90 and connected thereto by pin 94. Also provided between these ribs are a pair of opposedly arranged stop members or abutments 95 and 96 with pin 95a and 96a connecting them to the ribs. These stop members are only slightly movable about their pins, with their outwardly overhanging portions providing abutment faces overhanging the top face of the gear when the shaft and rake structure are in lowermost position.

Figure 8:
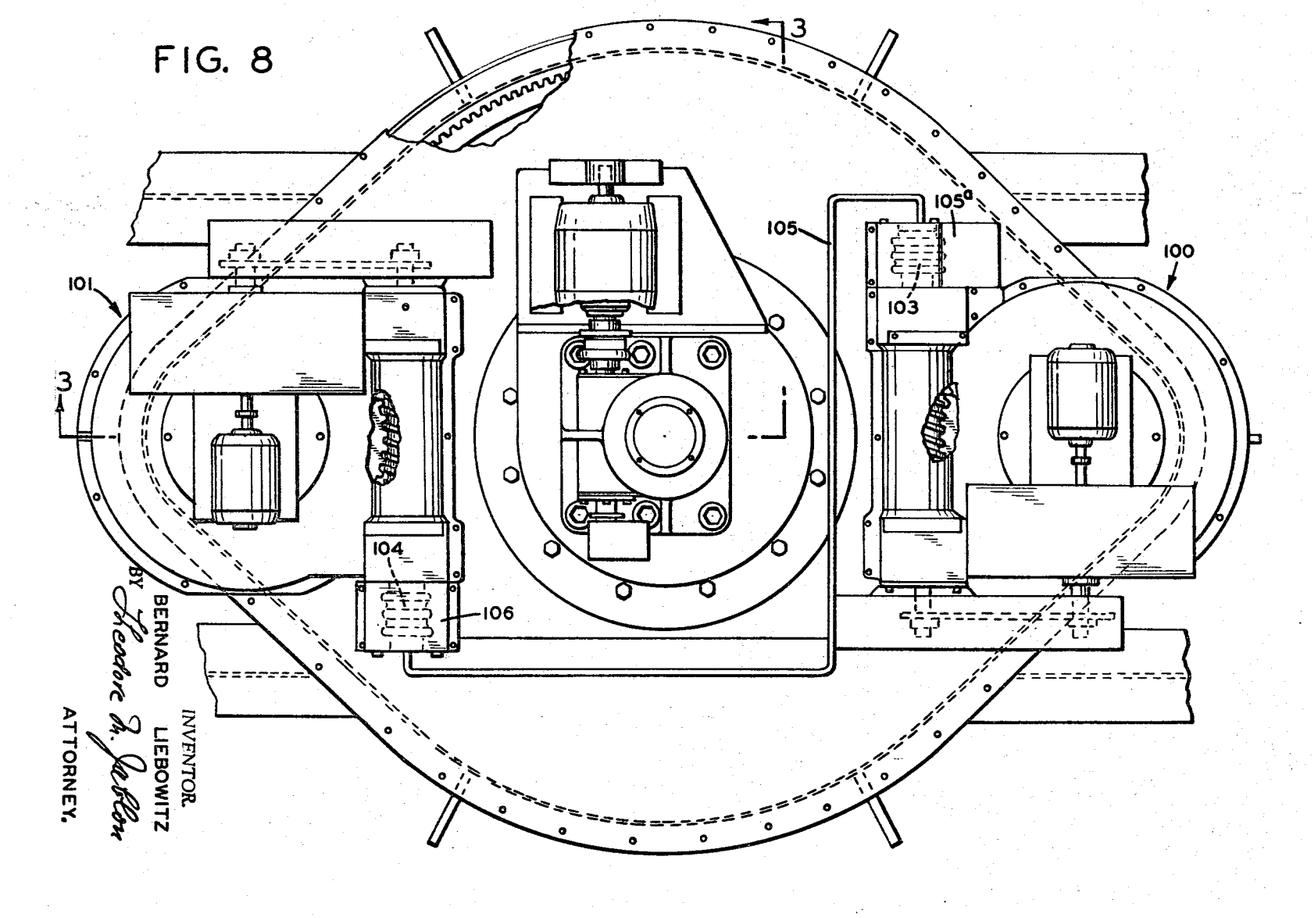
FIGURE 8 is a top view of the drive head equipped with duplex pinion drive arrangement and hydraulic torque balancing means operatively interconnecting them.
Figure 9:
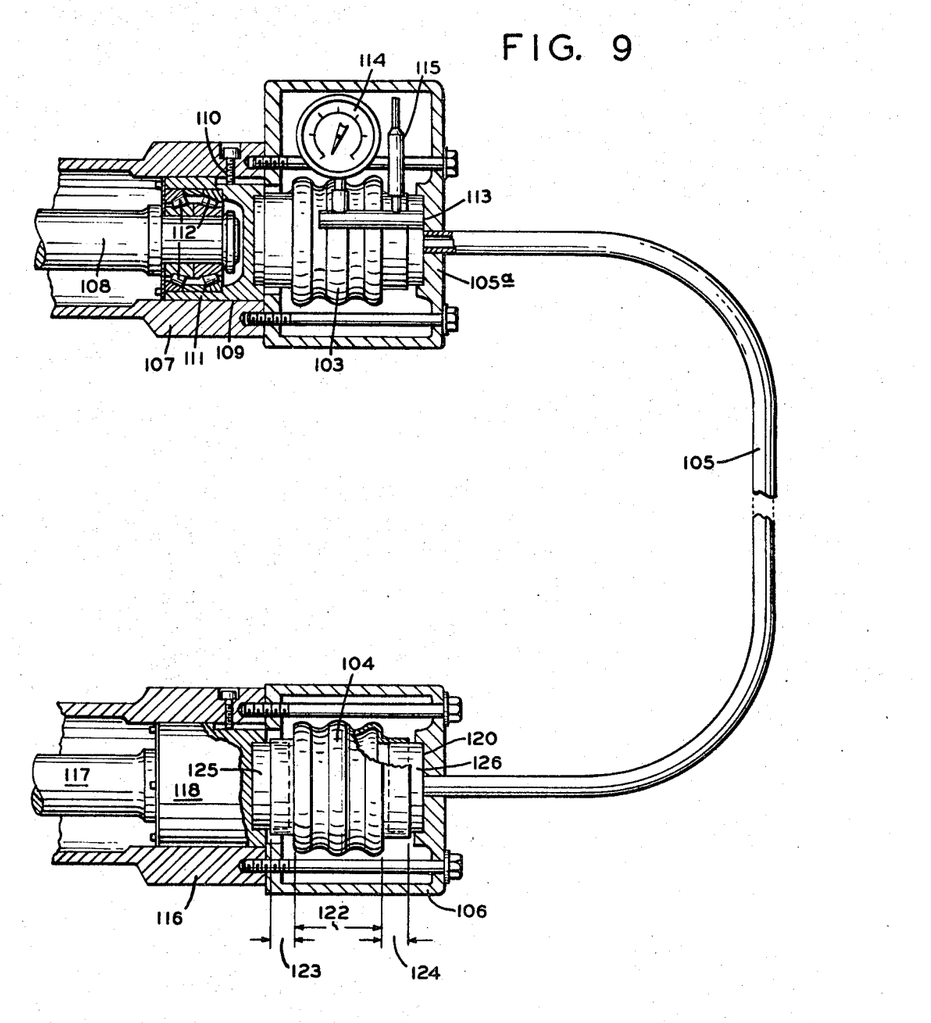
FIGURE 9 illustrates the function of the torque-balancing means in the mechanism shown in FIG. 8.

An added feature qualifying the drive head of this invention more particularly for heavy torque loads and heavy duty operation, lies in the embodiment illustrated in FIGURES 8, 9, and 10 to be considered in conjunction with features so far described and illustrated in FIGURES 1 to 7.

Accordingly, referring first to FIGURES 8 and 10, a pair of self-contained motorized pinion drive units 100 and 101 engaging the spur gear are mounted opposite each other on the top plate of the housing structure, each substantially resembling the single drive unit shown in FIGURE 3. However, each of the drive units 100 and 101 has worm drive means differing from the one in FIGURE 3, insofar as allowance is made for axial movement of the worm shaft member in the gear housing, in order that the thrust from one of the worm shaft members may be balanced against the thrust from the other, and both drive units will assume each its equal share of the total driving torque applied to the gear, for heavy duty balanced operation.

To this end there is provided a closed and self-contained hydraulic pressure system detachably connected to the respective worm gear casings and exposed to the thrust of the respective worm shaft members, and thus hydraulically interbalancing the same. This pressure system (see FIGURE 9) comprises a pair of axially yieldable and compressible pressure chambers 103 and 104 coaxial with the worm shaft members. One end of each pressure chamber is exposed to the thrust of the respective worm shaft member, the opposite end being confined by abutment means which are fixed relative to the respective gear casing. An equalizing conduit 105 interconnects the pressure chambers.

Preferably, the abutment means are in the form of auxiliary casings 105a and 106 detachably bolted to the respective gear casings, as more clearly shown in FIGURE 8 which also illustrates more clearly the manner in which the thrust from the worm shaft member is imparted to the pressure chamber and thus to the closed hydraulic pressure system.

Accordingly, in FIGURE 9, the one drive unit is represented by a portion 107 of the gear casing wherein a worm shaft member 108 is axially movable, having its thrust imparting end supported in a thrust bearing unit 109 which is slideable in the casing although secured against rotation therein as indicated by the guide means 110. The bearing unit comprises a cup-shaped thrust member 111 in abutting contact with the adjoining end face of the associated pressure chamber, and twin coaxial roller bearings 112 contained in the thrust member, capable of absorbing radial bearing pressure as well as axial thrust from the worm shaft member in both directions.

The pressure chamber is confined by the auxiliary casing 105a detachably bolted to the gear casing, and which provides the abtument portion or face 113 for the opposite end of the pressure chamber. Pressure responsive devices are connected to communicate with the pressure chamber, such as a pressure gauge 114 providing a measure of the torque load imposed upon the rake structure, and a pressure responsive electric switch device 115 adapted to send control impulses to suitable relay actuated means or the like in response to a predetermined torque overload.

Similarly, the other drive unit is represented by the casing portion 116, with the worm shaft member 117 having its end portion supported in the thrust bearing unit 118 similar to the one described above, and having thrust imparting relationship with the adjacent end face of the pressure chamber 104. The auxiliary casing 106 is detachably bolted to the gear casing, providing the abutment portion or face 120 for the opposite end face of the pressure chamber 104. The equalizer conduit or pipe 105 interconnects the two pressure chambers and constitutes therewith and with the pressure responsive devices a closed self-contained hydraulic pressure system filled with a non-compressible fluid such as oil, which system is readily detachable from the respective drive units by unbolting the respective auxiliary casings 105a and 106. To establish accurate torque balance conditions between the drive units, the compressible pressure chambers should be constructed substantially identical in effect, so as to have substantially identical response. A practical construction of such a pressure chamber unit comprises a hollow body or shell of circular cross-section consisting for instance of a thin gauge metal. This body in turn comprises an intermediate corrugated main portion 122 and cylindrical end portions 123 and 124. Into these end portions are fitted end plug members 125 and 126 respectively, which plug members are sealingly connected as by brazing or the like to the cylindrical portions. Because of the corrugations this pressure chamber unit is axially compressible, but otherwise constructed to withstand the internal fluid pressure to which it is subjected due to the torque-balancing effect.

The cylindrical lower portion of the housing structure (see FIG. 3) has welded thereto a horizontal plate or flange 127 for mounting the drive head upon the supporting beam construction 11, with the rake shaft extending downwardly between the beams. Vertical radial reinforcing and stiffening ribs some of which are shown at 128 and 129, are weld-connected to the housing structure and to the flange, insuring great strength of the construction as a whole.

Figures 12, 13, 14:
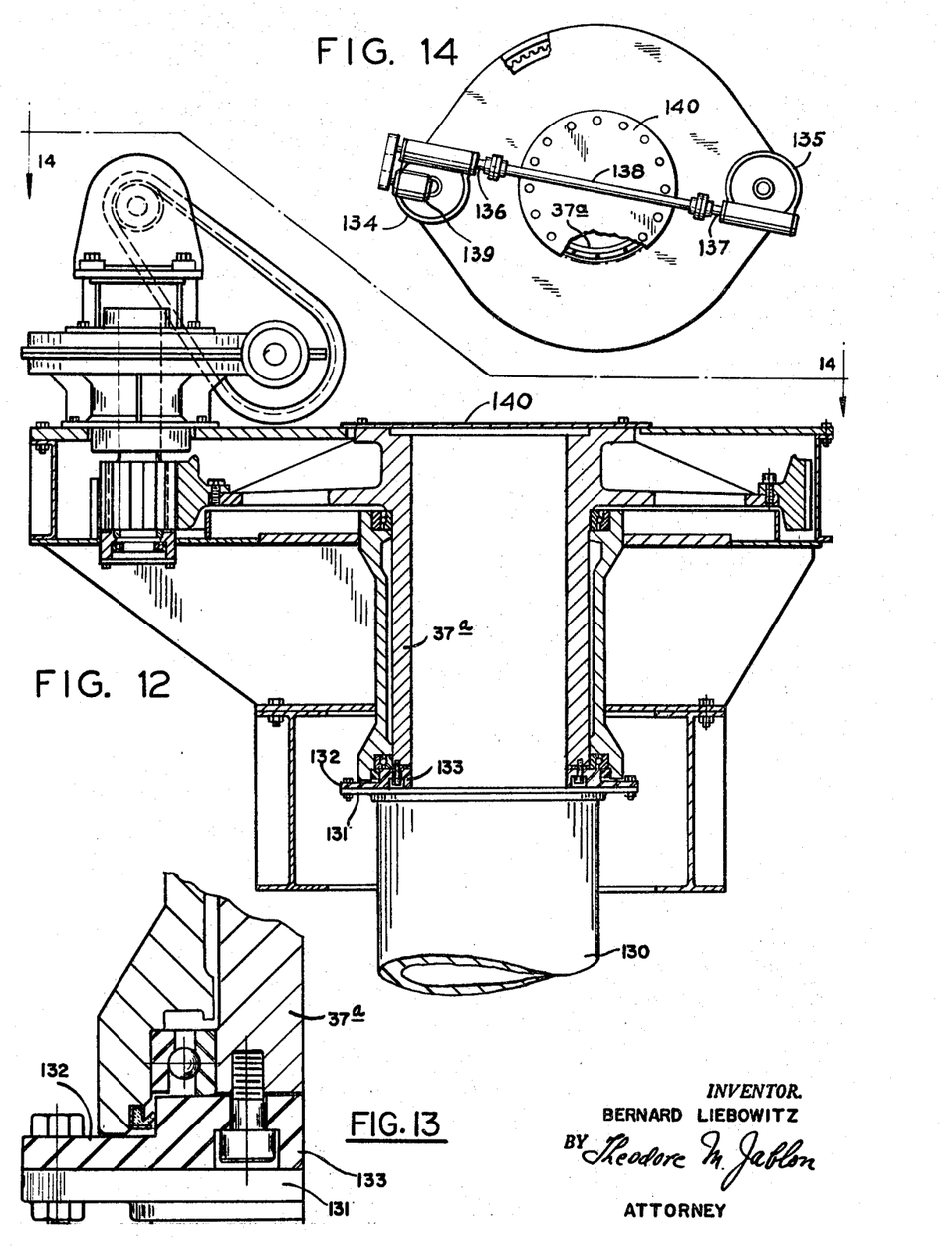
FIGURE 12 is a vertical sectional view of the drive head similar to FIG. 3, showing another embodiment of the invention without rake lifting devices.
FIGURE 13 is an enlarged detail taken from FIG. 12.
FIGURE 14 is a top view of the drive head, taken on line 14—14 in FIG. 12, but showing a pair of pinion drive units instead of one.

According to the embodiment in FIGS. 12 and 13, the drive head generally resembling the one in FIG. 3, requires a rake shaft 130 to be rigidly fixed to the cylindrical gear extension 37a. To this end, a top end flange 132 is formed on a shim retainer ring 133. While this shim retainer ring as such serves the same purpose as the retainer ring 73 in FIGS. 5 and 6, in this embodiment it also serves as a connecting member between the gear extension and the shaft. It will be seen that it is relatively simple to convert the embodiment illustrated in FIG. 3 into the embodiment illustrated in FIG. 12, and vice versa.

A top view of the drive head of FIG. 12 is shown in FIG. 14, but showing a pair of pinion drive units 134 and 135 mechanically interbalanced so that both units will assume equal shares of the driving torque. Torque balance between the units is achieved by having the respective worm shafts 136 and 137 of the units interconnected by a coaxial shaft 138. This shaft assembly as a whole acting as a single shaft driven by motor 139, is axially slideable in the drive units so it will axially adjust itself to a position where both drive units will assume equal shares of this driving torque. A cover plate 140 rotates with the gear.

In a practical example of one embodiment of this invention, the hollow rake shaft may have an effective outer diameter of about 24 inches for transmitting a torque in the order of 400,000 foot pounds, with a rake structure having a spread of about 125 feet, and with the drive head comprising a pair of torque balanced pinion drive units.

Figure 15:
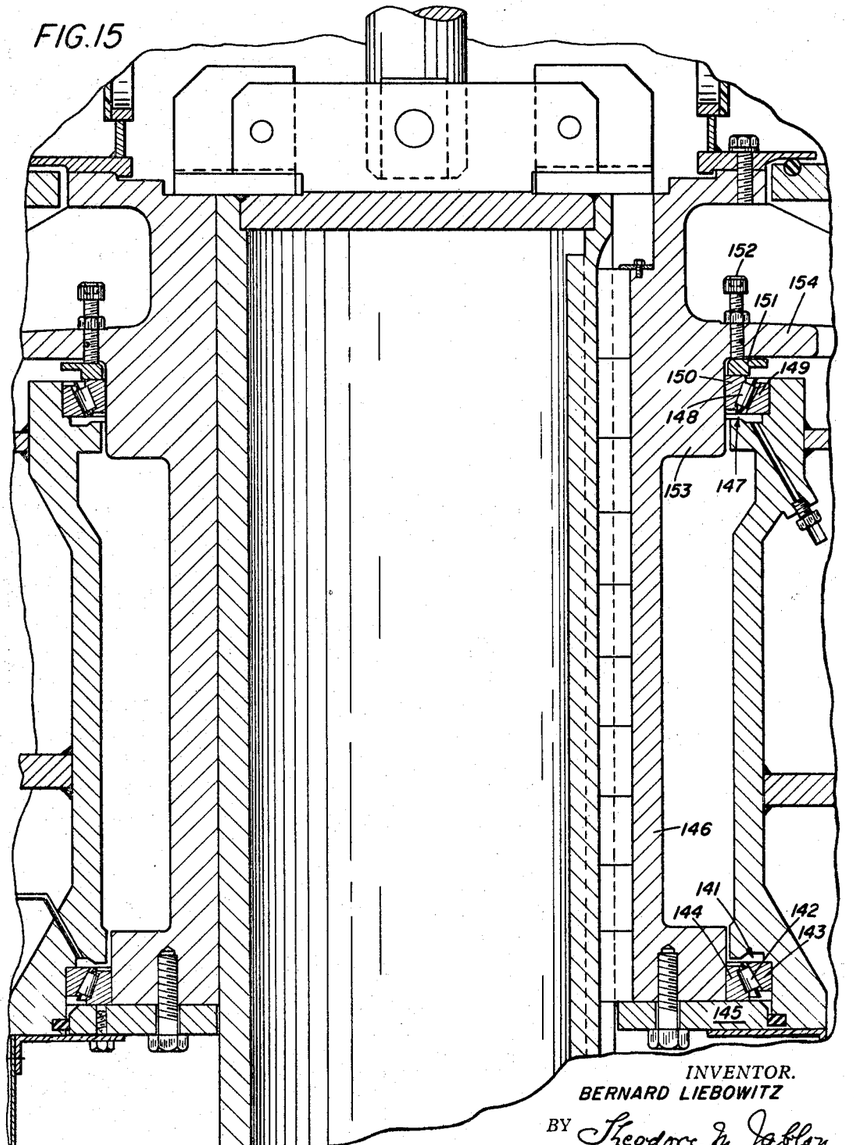
FIG. 15 is similar to FIG. 5, showing another form of the bearing tolerance adjustment means.

FIG. 15 while similar to FIG. 5, embodies another form of tolerance adjusting means for the bearings. In this embodiment the bearings are conical roller bearings with tolerance adjusting means associated with the upper bearing, whereby these bearings may be pre-loaded. The lower bearing 141 comprises conical rollers 142 confined between an outer bearing race 143 seated in the gear housing, and inner bearing race 144 engaged by a retainer ring 145 bolted to the lower end of the downward cylindrical extension 146 of the gear. The upper bearing 147 comprises conical rollers 148 confined between an outer bearing race 149 seated in the gear housing, and an inner bearing 150 engaged by a thrust ring 151 under pressure from a suitable number of vertical set screws 152 threaded into the gear adjacent to the hub portion thereof, and evenly spaced around the same. A desired degree of pre-load upon the bearings is attainable by evenly adjusting and locking the set screws in the gear.

In summary, it will be seen that the invention in a preferred embodiment provides a powerful heavy duty torque-balanced drive head for the sediment engaging structure depending therefrom. This is a drive head of great ruggedness featuring a vertically oriented bearing arrangement or vertical stabilization base in a housing structure that is of great strength yet relatively light. That is to say, a simple plate construction largely welded surrounds the spur gear driving the depending shaft, while weld-connected to the underside of the plate construction is a simple cylindrical section mounting the vertically spaced combination bearings. Both bearings surround the downward tubular extension that is fixedly connected to the gear. Mounted upon the gear and connected to the top face of the rake shaft is a simple rake lifting mechanism for vertically shifting the rake shaft member relative to the gear, with balanced torque transmitting means effective between the guide faces of the gear and tubular extension and the shaft. If more than one drive pinion unit is mounted on the housing structure for applying an increased load to the gear, then a detachable self-contained hydraulic pressure system is provided for maintaining a balanced driving torque upon the gear, with the hydraulic equalizing conduit means therein readily arrangeable to avoid interference with the rake lifting device.

It will be furthermore understood that each of the elements, or two or more together, of the apparatus herein described, may also find a useful application in other types of drive heads for sedimentation apparatus differing from the type described above.

Furthermore, while the invention has been illustrated and described as embodied in a sediment raking apparatus having a drive head with depending shaft, supported by an overhead construction transversing a settling tank, it is not intended to be limited to the details shown, since various modifications and structural changes may be made without departing from the spirit of the present invention.

I claim:
1. In a continuously operating sedimentation apparatus having a settling tank, sediment conveying apparatus which comprises,
   a vertical shaft carrying sediment raking means at its lower end portion;
   a drive gear having a downwardly extending concentric tubular portion fixedly connected therewith;
   a stationary housing structure having an upper portion surrounding said gear and having a lower portion surrounding said downwardly extending tubular portion;
   an upper combined radial- and axial thrust bearing surrounding said tubular portion of the gear and located adjacent to the underside of said gear so as to be effective between said gear and an adjacent portion of said housing structure, said bearing being constructed and arranged for transmitting axial thrust from said gear downwardly to said housing structure;
   a lower combined radial- and axial thrust bearing spaced downwardly from said upper bearing, and comprising an outer bearing race seated in said housing structure, an inner bearing race fitted over the lower end of said tubular portion of the gear, and anti-friction bearing elements effective between said bearing races, said lower bearing being constructed and arranged to transmit upward axial thrust from said inner bearing race to said outer bearing race, said lower bearing together with said upper bearing constituting a vertical anti-tilting base;
   retainer means detachably secured to the lower end of said tubular gear portion and engaging said inner bearing race and adapted to transmit thereto upward thrust;
   means for adjusting the operating tolerance between said upper and lower bearings;
   means for supporting said shaft from said gear concentrically and in torque-transmitting relationship therewith as well as axially confined so that downward thrust upon the shaft is absorbed by said upper bearing and upward thrust is absorbed by said lower bearing;
   a drive unit for said drive gear, mounted on said upper portion of said housing structure;
   and horizontal support structure extending transversely of the top portion of the tank for mounting said housing structure and said shaft in vertical position.

2. The sediment conveying apparatus according to claim 1, wherein said retainer means comprise annular retainer structure surrounding the shaft, bolts for fastening said annular structure to the lower end of said tubular gear portion, and shim material interposed between said annular structure and said lower end of the gear portion for adjusting said tolerance.

3. The apparatus according to claim 2, wherein said annular retainer structure is a split ring.

4. The sediment conveying apparatus according to claim 2, wherein said shaft has a flange at its upper end, and means for rigidly connecting said flange and shaft to said annular retainer structure.

5. The sediment conveying apparatus according to claim 1, wherein said tolerance adjusting means comprise set screw means threaded into said drive gear for thrust engagement with the inner bearing race of said upper bearing.

6. The sediment conveying apparatus according to claim 5, wherein a thrust ring is interposed between said set screw means and said inner bearing race.

7. The sediment conveying apparatus according to claim 5, wherein said upper and lower bearings are conical roller bearings.

8. The sediment conveying apparatus according to claim 1, wherein said housing structure comprises a substantially cylindrical lower section having an inner annular recess at each end, in which recesses are seated the respective upper and lower bearings, and a substantially wider and relatively shallow upper section surrounding said gear, which upper section in turn comprises a bottom plate surrounding the upper end portion of said cylindrical lower section and having rigid connection therewith, an upstanding wall extending along the outer edge of said bottom plate, and a top plate having its edge portions detachably secured to the top edge of said upstanding wall.

9. The sediment conveying apparatus according to claim 8, wherein said retainer means comprise an annular retainer structure, bolts for fastening said annular structure to the lower end of said tubular gear portion, and shim material interposed between said annular structure and said lower end of the gear portion, with the addition of a lower annular grease sealing means effective between said annular retainer structure and the lower end of said housing structure, and an upper annular grease sealing means fastened to the top end of said cylindrical lower housing portion and sealingly overlying said upper bearing.

10. The sediment conveying apparatus according to claim 8, wherein said bottom plate of the upper housing section surrounds the upper end portion of said cylindrical section, spaced downwardly from the top face of said cylindrical section.

11. The sediment conveying apparatus according to claim 10, wherein there is welded to said bottom plate of said upper housing section another upstanding wall having a free upper edge and spaced inwardly from the first-mentioned upstanding wall and constituting therewith an oil trough for the toothed rim portion of said gear.

12. The sediment conveying apparatus according to claim 1, wherein said tubular portion of the gear is fitted over the upper end portion of said shaft, and said torque transmitting means are provided effective between said tubular portion and said shaft.

13. The sediment conveying apparatus according to claim 1, wherein said shaft has an upper end portion vertically slideable in said tubular gear portion, with said torque transmitting means effective between said tubular gear portion and said vertically slideable shaft;

wherein a vertical cage structure is mounted concentrically on said gear to rotate therewith, and to extend upwardly therefrom through the top of said housing structure, said cage structure adapted to accommodate therein the top end portion of the shaft when the same is being raised and lowered, and wherein lifting devices are provided for raising and lowering said shaft with the raking means, said devices being supported from the top end of the cage structure.

14. The sediment conveying apparatus according to claim 13, wherein said retainer means comprise annular structure surrounding the shaft, bolts for fastening said annular structure to the lower end of said tubular gear portion, and shim material interposed between said annular structure and said lower end of the gear portion for adjusting the bearing tolerance, and wherein an annular grease sealing means is effective between the annular retainer structure and the lower end of the housing structure, with the addition of a boot of deformable material, surrounding a portion of said shaft directly below the lower end of said housing structure, and having an upper peripheral edge portion connected to said annular retainer means and having a lower peripheral edge portion connected peripherally to said shaft, said boot being constructed and arranged so as to axially expand and contract in accordance with vertical movements of the shaft, and an annular dust seal concentric with the shaft axis and effective between the foot end portion of said cage structure and the surrounding top portion of said housing structure, whereby said boot together with said housing structure, with said cage structure and with said annular dust seal, and with said grease sealing means constitute a closed system wherein the shaft guiding surfaces and said upper and lower bearings are protected.

15. The sediment conveying apparatus according to claim 13, wherein said shaft comprises a lower portion carrying the raking means, an upper end portion, and a flange connection co-axially inter-connecting said shaft portions, said upper shaft portion comprising a tubular member constructed for engagement by vertical rows of said torque transmitting means, wherein said lifting devices comprise a vertical screw spindle with means for connecting the lower end of said spindle to the upper end face of said upper shaft portion, so that the spindle is secured against rotation relative to the shaft, a nut member threaded on said shaft and mounted for rotation on the top end of the cage structure, and secured against axial displacement, and means for rotating said nut member for raising or lowering said shaft.

16. The sediment conveying apparatus according to claim 15, wherein the lower end connecting means for the spindle comprise a pair of parallel transverse upstanding ribs welded to the top end of said shaft, and having the lower end of said spindle interposed between the ribs and connected thereto.

17. The sediment conveying apparatus according to claim 1, wherein said tubular gear portion is fitted over the upper end portion of said shaft, wherein said torque transmitting means comprise a plurality of vertical rows of torque transmitting elements of circular cross-section effective between said tubular gear portion and said upper end portion of the shaft, said rows being constructed and arranged so as to provide for balanced torque transmission from said gear to said shaft while allowing for vertical sliding movement of said shaft relative to the gear, wherein a vertical cage structure is mounted concentrically on said gear to rotate therewith, and to extend upwardly therefrom through the top of said housing structure, said cage structure adapted to accommodate therein the top end portion of the shaft when the same is being raised and lowered, wherein lifting devices are provided for raising and lowering said shaft with the raking means, said devices being supported from the top end of the cage structure, wherein said drive gear is a spur gear, and said drive unit for the gear comprise a first pinion drive unit having a gear housing formed with a bottom flange, a pinion and pinion shaft mounted in said gear housing for rotation about a vertical axis with the pinion located below said bottom flange so that it meshes with said gear when said drive unit is in place with said bottom flange connected to the top of said housing structure and said pinion shaft extending through said top, and wherein said drive unit further comprise another similar pinion drive unit in driving engagement with said gear opposite to the first mentioned pinion drive unit, each said drive unit comprising a worm gear and a worm shaft member therefor to rotate the respective pinion, each worm shaft member being axially movable in said gear housing, and having a reaction thrust imparting end; and a closed self-contained hydraulic pressure system operatively interconnecting the thrust imparting ends of the worm shaft members of said drive units and effective to establish and maintain a balanced torque from both drive units to said gear, said closed hydraulic pressure system having compressible pressure chambers at each end attachable to and detachable from the respective ends of the respective gear housings adjacent to said thrust-imparting ends of the worm shaft members, and a communicating conduit interconnecting said pressure chambers while by-passing said cage structure and said rake lifting device, whereby said drive units are torque-balanced relative to each other, while coperating with said torque-balanced torque transmitting means to provide complete torque balance for the sediment conveying apparatus.

References Cited

UNITED STATES PATENTS

| | | | |
|---|---|---|---|
| 1,475,289 | 11/1923 | Diescher | 285—299 X |
| 1,673,342 | 6/1928 | Sturtevant | 308—189.1 |
| 2,536,481 | 1/1951 | Winchell | 308—230 |
| 2,710,457 | 6/1955 | Cirrito et al. | 74—425 |
| 2,724,506 | 11/1955 | Hardinge | 210—528 |
| 2,782,013 | 2/1957 | Dittrich | 210—531 X |
| 2,920,908 | 1/1960 | Mitchell | 285—299 X |
| 3,240,349 | 3/1966 | Cookney et al. | 210—531 |
| 3,240,350 | 3/1966 | Petersen | 210—531 |
| 3,241,682 | 3/1966 | Cookney et al. | 210—528 |
| 3,252,349 | 5/1966 | Widdrington | 74—427 |

FOREIGN PATENTS 584,453  10/1959  Canada.

SAMIH N. ZAHARNA, *Primary Examiner.*

REUBEN FRIEDMAN, *Examiner.*

J. DECESARE, *Assistant Examiner.*